United States Patent [19]

Re et al.

[11] Patent Number: 4,699,969
[45] Date of Patent: Oct. 13, 1987

[54] FLUORINATED POLYMERS AND RESINS PREPARED THEREFROM

[75] Inventors: Alberto Re, Milan; Tiziano Terenghi, Renate, both of Italy

[73] Assignee: Ausimont S.p.A., Milan, Italy

[21] Appl. No.: 888,160

[22] Filed: Jul. 22, 1986

[30] Foreign Application Priority Data

Jul. 24, 1985 [IT] Italy .................... 21703 A/85

[51] Int. Cl.⁴ .................. C08G 59/30; C08G 50/02
[52] U.S. Cl. ........................ 528/70; 528/110; 528/401; 528/402; 427/130; 427/131; 427/132; 428/413; 428/418; 428/423.3; 428/694; 428/900
[58] Field of Search ............... 528/70, 110, 401, 402

[56] References Cited

U.S. PATENT DOCUMENTS

| | | | |
|---|---|---|---|
| 3,720,639 | 3/1973 | Griffith | 528/401 X |
| 3,833,545 | 9/1974 | Livshits et al. | 528/70 |
| 3,852,222 | 12/1974 | Field et al. | 528/70 X |
| 3,879,430 | 4/1975 | O'Rear et al. | 528/402 X |
| 4,157,358 | 6/1979 | Field et al. | 528/70 X |
| 4,645,827 | 2/1987 | Malabarba et al. | 530/322 |

*Primary Examiner*—Earl Nielsen
*Attorney, Agent, or Firm*—Stevens, Davis, Miller & Mosher

[57] ABSTRACT

New resins containing urethane and/or epoxy bonds are prepared starting from fluorinated polymers having an epoxy structure and exhibiting structural characteristics predominantly typical of epoxides or of polyols, said polymers being prepared by synthesis from one or more diols, at least one of which being a perfluoropolyoxyalkylene diol, and from epichlorohydrin; said polymers are subsequently subjected to a treatment with isocyanated if their structural characteristics are predominantly those of polyols, or with polyamines or anhydrides if their structural characteristics are predominantly those of epoxides.

21 Claims, No Drawings

FLUORINATED POLYMERS AND RESINS PREPARED THEREFROM

THE PRESENT INVENTION

Objects of the present invention are fluorinated polymers having an epoxy structure, prepared starting from epichlorohydrin and from one or more diols, at least one of which being a perfluoropolyoxyalkylene diol.

The polymers of the invention have general formula:

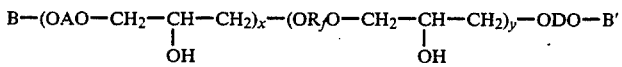   (I)

where:
x = an integer from 0 to 20, extremes included
y = an integer from 1 to 20, extremes included B, B', independently of each other, H or

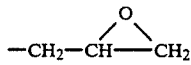

A = a radical of a fluorinated or non-fluorinated diol, containing one or more aromatic or cycloaliphatic or polycyclic rings, such as for example:

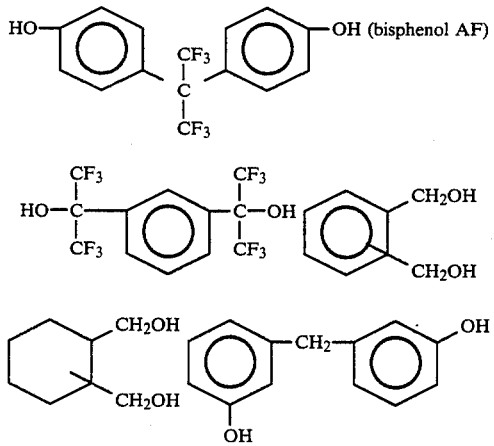

$R_f$ = a polyoxyfluoroalkylene radical deriving from the corresponding diol, comprising sequences of fluorooxyalkylene units having average molecular weight from 500 to 7000 selected from the following classes:

I $(C_2F_4O)$, $(CF_2O)$, said units being randomly placed along the fluoropolyoxyalkylene chain;

II $(C_3F_6O)$, $(C_2F_4O)$, $(CFXO)$ wherein X=F or $CF_3$, said units being randomly placed along the fluoropolyoxyalkylene chain;

III $(CH_2CF_2CF_2O)$, said units in the fluoropolyoxy-alkylene chain being linked between them as follows:

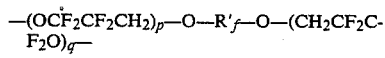

wherein $R'_f$ is a fluoroalkylene group and p and q are integer, p+q being higher than 2;

IV

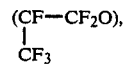

said units being linked between them in the fluoropolyoxyalkylene chain as follows:

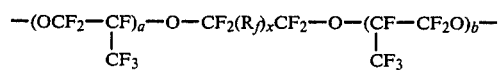

wherein $R_f$ is a fluoroalkylene group, x is 0 or 1, a and b are integer and a+b higher than 2;

V $(CF_2CF_2CF_2O)$;

VI $(CF_2CF_2O)$;

D = A or $R_f$.

The perfluoropolyoxyalkylene diols of class I can be prepared for example according to Italian patent application No. 903,446.

The perfluoropolyoxyalkylene sequences of units of class II can be prepared according to U.S. Pat. No. 3,665,091 those of classes III and V according to EP No. 148,482, those of class IV according to EP No. 151,877 and those of class VI according to U.S. Pat. No. 4,523,039, and the formation of their functional end groups can be realized according to U.S. Pat. No. 3,810,874.

In the case of classes II, V and VI the bifunctional product can be obtained according to Italian Patent Application No. 22,920 A/85.

The various units forming the polymer of formula I have a random or block distribution inside the polymer.

The fluorinated polymers of the present invention are cross-linkable and predominantly possess the chemical reactivity typical of the epoxides when the end groups consist of an epoxy ring and simultaneously the sum of indexes x and y is in the range from 1 to 5, their chemical behavior is predominantly that of the polyols when (x+y)>5.

By consequence, the polymer having predominantly polyol structural characteristics can be subsequently treated with polyisocyanates, while the polymer with structural characteristics predominantly of epoxide can be treated with amines or anhydrides.

However, as the change from epoxy nature to polyol nature occurs gradually, both characteristics may coexist inside a polymer chain in which the sum of the units which contain A and $R_f$ ranges, for example, from 1 to 5, wherefore the treatment may be also of the mixed type: polyisocyanate+amine or anhydride, the reaction condition having to be adjusted so as to permit this.

Furthermore, by varying the abovesaid polymer characteristics and by varying the amount of units A and $R_f$ forming it, their reciprocal ratio and their chemical nature, a wide range of polymers and of resins for a plurality of uses is obtained.

THE PRIOR ART

There are known crosslinked fluorinated resins of the epoxy and urethane type, prepared starting from epichlorohydrin, a fluorinated bisphenol and hexafluoropentanediol (U.S. Pat. No. 3,852,222); analogous resins, in which hexafluoropentanediol is substituted by the cis or trans isomer of formula:

HO(CF$_3$)$_2$CCH$_2$CH=CHC(CF$_3$)$_2$OH, which is less expensive (U.S. Pat. No. 4,132,681), are known too. Such crosslinked resins, however, have a very high glass transition temperature (Tg) and hardness characteristics which limit the use thereof only to certain applications.

There are also known and described in U.S. Pat. No. 3,810,874 polyepoxides which are cross-linkable with amines; such polymers, however, once they are crosslinked, do not possess a satisfactory complex of mechanical characteristics, such as hardness, tensile strength, modulus of elasticity, elongation.

Therefore, the polymers of the prior art are not suited to particular applications, such as e.g. in printed circuits, in which the coating polymer has to possess, along with exceptional characteristics of resistance to heat or to solvents, also a high chemical stability and high mechanical properties even at very low temperatures.

Thus, there is a strong need for producing highly crosslinked resins of the urethane or epoxy type, which should exhibit improved mechanical characteristics and, above all, should be capable of offering advantages as regards the uses, as compared with analogous products already known.

There is also the requirement of having available on the market resins with bonds of the urethane or epoxy type, which should behave as fluorinated rubbers, but with improved mechanical properties with respect to analogous known products.

It is also important to make available resins endowed, as compared with the ones of the art, with improved characteristics of stability to heat and to oxidation, of resistance to water, to solvents and to the atmospheric agents, low surface energy, no degradation to UV-rays, low wettability, low refraction index, low Tg, high thermal coefficient, low dielectric constant.

Furthermore there is the requirement of succeeding in obtaining a wide range of resins, employable in several and different fields of use, which could be obtained starting from a sole polymeric precursor, adaptable to the various requirements.

DETAILED DESCRIPTION OF THE INVENTION

It has now surprisingly been found that the polymers of general formula I, after a suitable treatment, are capable of providing resins containing bonds of the urethane and/or epoxy type, having excellent mechanical characteristics in a surprisingly broad temperature range ($-120°$ to $+300°$ C.).

Thus, an object of the present invention are the fluorinated polymers of general formula I having structural characteristics prevailingly of an epoxide or of a polyol.

Another object of this invention are fluorinated resins prepared by means of a subsequent treatment carried out on the hydroxy or epoxy groups of said polymers of formula I.

A further object of the invention are fluorinated resins endowed with exceptional mechanical properties and a high stability to sunlight, to heat and to chemical and atmospherical agents in a surprisingly wide range of temperature ($-120°$ to $+300°$ C.), which can be used as adhesives, structural materials, paints, coatings.

Still another object of the invention are fluorinated rubbers with bonds of the urethane or epoxy type, endowed with excellent mechanical properties and a Tg lower than $-80°$ C.

The polymers of general formula I of the present invention are preparable by synthesis according to the following scheme:

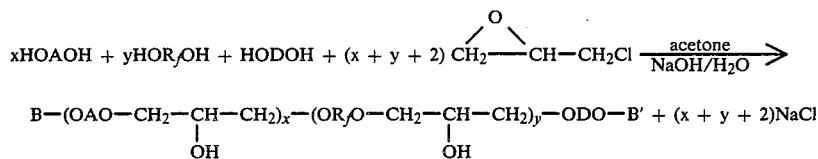

where A, R$_f$, D, x and y are the same as defined hereinbefore; and

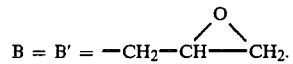

They are obtained by heating at reflux a solution in acetone of diol HOAOH and of diol HOR$_f$OH with epichlorohydrin and aqueous sodium hydroxide in excess by 10–20% with respect to the total equivalents of the diols. At the end of the reaction, most of acetone is evaporated and the polymer is poured into an excess of distilled water at 80° C. under stirring. The mixture is then cooled down to room temperature and decanted. Such operation is repeated until neutralization of the washing waters. The polymer is then dissolved in a mixture of 1, 1, 2-trichlorotrifluoroethane (DELIFRENE LS) and acetone (80/20) and filtered.

The product so obtained is a random fluorinated polymer having values of x and y depending on the initial molar ratio of fluorinated diols HOAOH and HOR$_f$OH and on the amount of epichlorohydrin utilized. In particular, if the epichlorohydrin excess is >20% referred to the stoichiometric ratio, the sum of x and y is $\leq 5$, and a polymer having a predominantly epoxy nature is obtained.

Conversely, if the amount of epichlorohydrin employed varies from a molar ratio 1:1 up to 20% in excess with respect to the total amount of diols, the polymer has a number of units x+y>5 and has predominantly the characteristics of a polyol.

However, as the change from the epoxy nature to the polyol nature occurs gradually, both characteristics may coexist within a polymeric chain; by consequence it is possible to carry out, for such products, a mixed treatment with isocyanate and amine or anhydride, in such a case, of course, efforts are to be made to adjust optimum reaction conditions.

In the case in wich both structural characteristics of epoxide and of polyol exist and that the polymer, conversely, is treated only on the epoxy end groups, there are obtained resins containing OH functional groups utilizable for further subsequent reactions.

The viscosity of the resulting polymer depends on the initial reciprocal ratio of diols HOAOH and HOR$_f$OH, and on the ratio of both to the total amount of epichlorohydrin.

It is possible to obtain polymers having viscosities which vary over an extremely wide range of values, in relation to the various fields of use and to the characteristics of the final resin to be obtained from said polymers.

An alternative method to the one previously described for preparing the fluorinated polymers of the invention utilizes, as a starting product, the bisepoxide of formula:

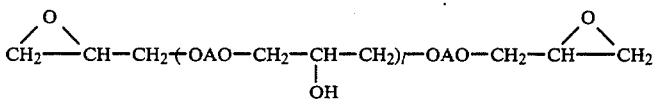

or

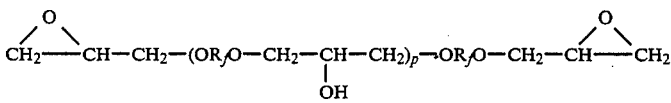

wherein A and R$_f$ are the same as defined hereinabove and l and p are integers higher than or equal to zero.

By heating the bisepoxide containing radicals A or R$_f$ with the diol of R$_f$ or of A, respectively, and with a catalyst consisting of a tertiary amine (such as diazadicyclooctane and dimethylbenzylamine) to 100°–165° C. for 6–20 hours in a thermo-regulated pressure reactor, there are obtained block fluorinated polymers having the value of x and y depending on the molar ratio of the reagents containing groups A and R$_f$. High molecular weight polymers are obtained, in particular, when the A/R$_f$ molar ratio is close to 1; when the molar ratio is close to 0.5 or to 2, low molecular weight polymers are obtained. The end groups will be of the epoxy or hydroxyl type depending on whether an excess of bisepoxide or of diol is used.

The block fluorinated polymers so obtainable behave in the same manner as the random polymers obtained according to the method described hereinbefore.

For both types of polymers, i.e. the block polymers and the random polymers, the values of x and of y can be determined by titration of the epoxy end groups or of the hydroxyl groups and by NMR analysis.

Resins containing urethane-type bonds are preparable by treating the polymers having structural characteristics prevailingly of polyols with polyisocyanate and catalyst, whether or not in the presence of a solvent. Fluorinated or non-fluorinated di-, tri- and tetra-isocyanates can be used as well.

Preferred fluorinated diisocyanates are the ones having an average molecular weight of 500–7000 and comprised in the following general formula:

OCN—R—Z—CF$_2$O—(C$_2$F$_4$O)$_m$—(CF$_2$O)$_n$—CF$_2$—Z—R—NCO wherein:
Z may be a simple bond or a group of the type:
—CONH—, —CH$_2$—, —CH$_2$O—, —CH$_2$OCH$_2$—, —O—, —CH$_2$OSO$_2$—;
R is an aliphatic divalent radical having a chain C$_1$–C$_{12}$, or a cycloaliphatic or aromatic radical, in particular it may be:

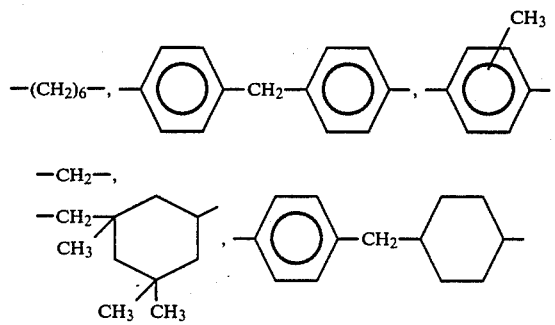

and where the units (CF$_2$O) and (C$_2$F$_4$O) are statistically distributed along the chain, m and n are integers and the m/n ratio ranges from 0.2 to 2 and preferably from 0.5 to 1.2.

The perfluoropolyoxyalkylene isocyanates referred to above can be obtained according to known methods, for example the ones described in U.S. Pat. No. 3,810,874.

Among the non-fluorinated polyisocyanates, use is preferably made of hexamethylene diisocyanate (HDI), isophorone diisocyanate (IPDI), toluene diisocyanate (TDI), methylene-bis-(4-cyclohexyl isocyanate) (H$_{12}$MDI) and trimers of TDI and HDI.

The polyol polymers and the polyisocyanate are reacted according to an equivalent OH/NCO ratio ranging from 0.7 to 1.3, preferably from 0.9 to 1.1.

For reactions in solvent it is possible to utilize solvents such as esters, such as butylacetate and amylacetate, ketones such as methylethylketone and methylisobutylketone, and aromatic hydrocarbons, such as xylene and toluene, optionally in admixture with solvents, which are typical for the perfluoropolyethers, such as 1,1,2-trichlorotrifluoroethane (DELIFRENE LS). The preferred solvent is a 80/20 mixture of DELIFRENE LS and acetone.

The amount of solvent employed depends on the viscosity to be obtained for the solution. The reaction giving rise to the polyurethane bond may be either or not catalyzed by the catalysts which are generally utilized in the technology of the polyurethanes obtained from polyols and polyisocyanates; in any case the addition of an efficacious catalyst system permits to operate at low temperatures (20°–60° C.) and in short times. Furthermore, a proper proportioning of the catalyst permits to optimize the pot life, i.e. the time during which the reaction mixture remains fluid enough.

As catalysts there are utilizable the derivatives of tin, such as dibutyltin dilaurate, dibutyltin diacetate, dibutyltin oxide, derivatives of iron, such as iron acetylacetonate, titanium alcoholates, such as titanium tetraisopropylate, tertiary amines such as triethylamine, in amounts ranging from 0.001 to 2% by weight referred to the total weight, preferably from 0.01 to 0.5%.

Epoxy resins are preparable by reacting the polymers having structural charcteristics prevailingly of epoxides with polyamines or anhydrides of polycarboxylic acids in a solvent.

The known technology for the field of the epoxy resins is fully utilizalbe for the above purposes.

Useful polyamines may be primary or secondary, aliphatic or aromatic polyamines. Polyamines containing perfluoropolyoxyalkylene chains, such as those described in U.S. Pat. No. 4,094,911, can be used too.

Conversely, if anhydrides are used, also a catalyst, such as dimethylbenzylamine, in amounts of from 0.15 to 0.60% by weight is added in order to shorten the times and reduce the reaction temperatures.

Some examples of suitables amines or anhydrides are: phthalic anhydrides, Diels-Alder adducts, metaphenylenediamine, diethylenetriamine and xylyldiamine. The diamine is additioned so as to have an aminohydrogen for each epoxide equivalent, variations of ±10% are allowable.

The solvent may be any solvent capable of solubilizing the epoxy resins. It is possible to utilize the ones listed hereinbefore for the urethane resins; furthermore, since no isocyanic groups are present, also solvents containing alcohol groups can be used.

The solvent amounts depends on the viscosity to be imparted to the solution. Generally, solutions containing from 35 to 60% by weight of solvent are utilized.

The epoxy resins can be treated with the abovesaid polyamines by heating the solution containing the epoxy polymer to temperatures ranging from 20° to 60° C. during 3 or 4 hours, and subsequently, for about one hour, to temperatures ranging from 50° to 90° C.

If the treatment with anhydride is conducted in the presence of a catalyst, such as a tertiary amine, the reaction temperature will then range from 75° to 85° C. for about one hour and successively from 110° to 130° C. for about 3 hours.

However, times and temperatures can be varied according to the appliances and to type of polymers used.

Both solutions, the one containing the polyol polymer for providing resins containing urethane-type bonds, and the one containing the epoxy polymer for providing resins containing epoxy-type bonds, can include other ingredients, such as pigments or fillers of other nature, in relation to the requirements of the sectors of use, which are capable of reducing the costs of the manufactured article, of increasing the consistency thereof, of promoting the equalization of the pigment inside the resin, or contribute in reinforcing the resin structure from a mechanical viewpoint.

The pigments and other fillers, having or not the nature of pigments, may be added for coating and/or protecting the surface on which the resin is spread, for example by reflecting the destructive sun rays which otherwise could pass through the resin and degrade the underlying material.

The resins prepared from the polymers of the invention, due to their high fluorine content, are consistent with fillers of particular nature, such such as the polytetrafluoroethylene (PTFE) and fluoroethylene/propylene copolymers (FEP), which may be added with a view to improving some mechanical charcteristics, such as impact strength and resistence to abrasion.

The chemcial-physical and mechanical properties of the new class of fluorinated resins, which are object of the present invention, make these materials suitable for a plurality of appliances.

The most important characteristics of such resins are:
a high fluorine content;
a high resistance to chemical agents, to hydrolysis and to atmospherical agents;
a high thermal stability;
a very low refraction index;
a high dimensional stabiliy;
a low wettability;
a high cross-linking degree;
self-lubricating properties;
excellent mechanical properties;
water-repellent and oil-repellent properties;
a low Tg;
a low dielectric constant;
a high thermal dissipation coefficient.

In consideration of such exceptional characteristics, some of the fields of use for the products of the invention are those of the adhesives, of the structural materials and of the high-efficiency composite materials, or, for example, in the sector of electronics, as supporting resins for printed circuits, encapsulating resins for chips, connection resins for electric cables.

Furthermore, a very broad field of use is the one of the coatings and paints in general, and in particular for printed circuits, magnetic tapes and discs, optical reading discs, optical fibres and optical systems in general, barrier paints for sea-environments, water-repellent coatings for undersea systems, coatings of mechanical parts immerged in solvents and, in general, coatings of metal systems subject to corrosion.

The advantages deriving from the use of the resins of the invention are generally due to the specific characteristics of said resins which are not present in the known products of the art. However, a considerable applicative advantage, mainly in the field of coatings and paints depends in particular on the fact that the polymers of the invention are obtainable with a very wide viscosity range, wherefore, in the case of subsequent crosslinkings in situ, they can be applied as such on the substrate if they already exhibit an optimum viscosity, or they can be disssolved or diluted in a suitable solvent up to the desired viscosity, and then applicated on the substrate to the coated and successively cross-linked.

Thus, an utmost interesting application is the one which is accomplished by mixing two solutions having the desired viscosity, even very low, and containing, in a proper solvent, respectively, the first one, the epoxy polymer of the polyol, and the second one, the isocyanate or the anhydride or the amine.

By immersion of the substrate to be coated into the mixture so prepared and after evaporation of the solvent and suitable final heat treatment it is possible to obtain self-lubricating protective coatings also of extremely low thickness.

Such procedure appears particularly suitable when the substrate to be coated is composed of materials which are potentially capable of interacting with the hydroxy groups of the polymer.

A further advantage of the polymers of the present invention consists in that said polymers, when subjected to a treatment with amines or anhydrides, exhibit free hydroxy groups along the chain, which are susceptible of a further subsequent cross-linking with polyisocyanates, or are utilizable for introducing different functional groups into the polymer.

The following examples are given to merely illustrate the present invention, without being however a limitation thereof.

EXAMPLE 1

67.2 g of bisphenol AF (0.2 moles) (formula I), 80 g of α, ω-bis-(hydroxymethyl)polyoxyperfluoroalkylene having a molecular weight of 400 (Z DOL 400) (0.2 moles) (formula II), 111 g of epichlorohydrin (1.2 moles) (formula III) were mixed in 800 cc of acetone in a three-neck flask having a 2-liter capacity. Separately, an aqueous solution of sodium hydroxide was prepared by dissolving 35.2 g of NaOH (0.88 moles) in 35.2 cc of distilled $H_2O$. This solution was added by means of a dropping funnel, in 15 minutes, mantaining an inside temperature of 35° C. On conclusion of the addition, it was heated at reflux for 8 hours. Now, most of the acetone was evaporated and the polymer was poured in distilled water at 80° C. (10 cc $H_2O$/g of polymer), under intense stirring for 5 minutes. The mixture was then cooled to room temperature and decanted. This step was repeated until neutrality of the washing water.

The polymer was then placed into an oven at 120° C. and allowed to dry overnight, then it was dissolved in a mixture of 1, 1, 2-trichlorotrifluoroethane (DELIFRENE LS) and acetone, 80/20, and filtered. Obtained were 180 g (yield=89%) of a fluid, fluorinated (40% of F; 3.5% of H), transparent, amber-colored polymer having the following characteristics:

| | |
|---|---|
| epoxy equivalent weight: | 420 |
| η 25° C.: | 144 poise |
| η 50° C.: | 7,4 poise |
| refraction index $n_D$ 20° C.: | 1,448 |

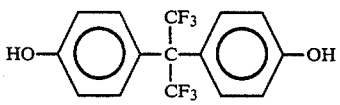  (formula I)

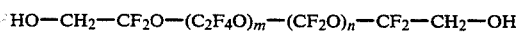  (formula II)

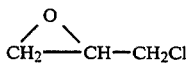  (formula III)

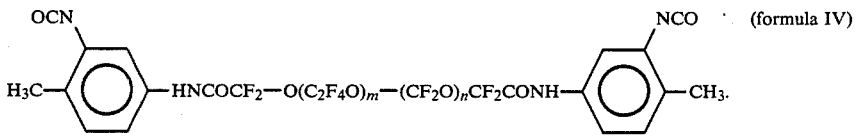  (formula IV)

EXAMPLES 2-5

Examples 2-5 show the effect of the variation of the ratios among the three components (bisphenol AF, Z DOL 400, epichlorohydrin) on the series of fluorinated polymers prepared according to the same modalities described in Example 1.

The characteristics of the above-cited polymers are indicated in Table 1.

EXAMPLE 6

In a three-neck flask there were dissolved 22.4 g of potassium terbutylate (0.2 moles) in 250 cc of terbutyl alcohol maintained at 35° C. by means of an outer heating bath. From a dropping funnel there were added, in 15 minutes, 200 g of α, ω-bis-(hydroxymethyl)polyoxyperfluoroalkylene (formula II), having a molecular weight=2000 (0.1 moles), allowing to react at 35° C. during one hour.

After addition of 27.8 g of epichlorohydrin (0.3 moles), it was heated to 70° C. during 4 hours. At the end, the rough product was poured into 700 cc of distilled water at 25° C. under stirring. It was allowed to rest, and the heavier phase was separated; this phase was dissolved in a solution of DELIFRENE LS and acetone (80/20), anhydrified with $Na_2SO_4$ and filtered.

There were obtained 200 g of a fluorinated (57.7% of F; 0.6% of H) (yield=93.5%), fluid, transparent, amber-colored polymer having the following characteristics:

weight of the epoxy equivalent: 2140
η at 25° C.: 4.8 poise
refraction index $n_D$ 20° C.: 1.309.

EXAMPLE 7

According to the modalities of Example 6, a fluorinated polymer was prepared by using 0.1 moles of α, ω-bis-(hydroxymethyl)-polyoxyperfluoroalyklene having a molecular weight=2000 and 0.5 moles of epichlorohydrin.

The fluorinated polymer obtained (57.8% of F; 0.5% of H) exhibited the following characteristics:
weight of the epoxy equivalent: 1293
η at 20° C.: 62 cpoise
refraction index $n_D$ 20° C.: 1.305.

EXAMPLE 8

Into a jacketed pressure reactor there were charged 52 g of bisphenol AF (0.155 moles), 100 g of the product of Example 7 (0.077 moles) and 1 g of diazadicyclooctane (commercial name: DABCO), and the whole was stirred for 10 hours at 165° C.

Obtained were 150 g of a fluorinated polymer (53% of F; 1% of H) having the following characteristics:
weight of the epoxy equivalent: 660
η at 25° C.: 989 poise
η at 50° C.: 22.4 poise

EXAMPLE 9

In a three-neck flask there were mixed, in a nitrogen atmosphere, 90 g of the polymer of example 1 (0.21 equivalents), 3.47 g of ethylenediamine (0.231 eq.) and 0.16 cc of a 0.204M solution of DABCO in acetone. The mixture was stirred at room temperature for 5 minutes, deaerated and poured into a mold, where it was left at 50° C. during 4 hours; subsequently it was treated at 70° C. for 1 hour.

Obtained was a stiff, transparent, cross-linked resin, insoluble in the DELIFRENE LS/acetone (80/20) mixture, having the following mechanical properties: hardness (Shore D)=71 (according to ASTM D 2240) tensile strength=356 kg/cm² according to ASTM D 1456 at 23° C.

elongation at break=25% according to ASTM D 1456 at 23° C.

EXAMPLE 10

In a three-neck flask there were mixed at 50° C., in a nitrogen atmosphere, 90 g of the polymer of example 4 (0.072 eq.), 14.2 g of DESMODUR N 100 (hexamethyleneisocyanate trimer) (0.072 eq.) and 0.20 cc of a 0.2008M solution of dibutyltindiacetate in acetone (0.1% by moles). The mixture was stirred for 5 minutes, deaerated and poured into a mold, where it was left at 50° C. for 20 hours.

A transparent, rubber-like polyurethane resin, insoluble in solvents such as DELIFRENE LS and acetone, with a hardness (Shore A/3") equal to 70 (according to ASTM D 2240) was obtained.

EXAMPLE 11

By operating according to the modalities of example 9, there were reacted 90 g of the polymer of example 6 (0.042 eq.), 0.695 g of ethylenediamine (0.046 eq.) and 0.16 cc of a 0.204M of DABCO in acetone. The mixture was left in the mold at 60° C. during 4 hours, the subsequent treatment being conducted at 80° C. for an hour.

Obtained was a transparent, rubber-like epoxy resin, insoluble in DELIFRENE/acetone and exhibiting the following mechanical characteristics:

| hardness (Shore A/3"): | 21 according to ASTM D 2240 |
| --- | --- |
| 100% modulus: | 4 kg/cm² |
| tensile strength: | 7 kg/cm² |
| elongation at break: | 197% |
| refraction index $n_D$ 20° C.: | 1.311 |
| Tg: | −121° C. |

EXAMPLE 12 (COMPARATIVE TEST)

By operating according to the same modalities as of Example 11, 54.3 g of the polymer of Example 7 (0.042 eq.), 0.695 g of ethylenediamine (0.046 eq.) and 0.16 cc of a 0.204M solution of DABCO in acetone were reacted. The mixture was left in the mold at 60° C. during 4 hours, a subsequent treatment being conducted at 80° C. for an hour.

Obtained was a transparent, friable epoxy resin, insoluble in DELIFRENE/acetone and having the following characteristics:

| hardness (Shore A/3"): | 36 according to ASTM D 2240 |
| --- | --- |
| tensile strength: | 3 kg/cm² |
| elongation at break: | 25% |

EXAMPLE 13

In a three-neck flask there were mixed, at 80° C. and in a nitrogen atmosphere, 40 g of the polymer of Example 8 (0.06 eq.) with 68.5 g of α, ω-bis-(tolylisocyanate)-polyoxyperfluoroalkylene having a molecular weight=2,300 (0.06 eq.) (formula IV) and 0.15 cc of a 0.2008M solution of dibutyltin-diacetate in acetone. The mixture was stirred for 30 minutes, deaerated and poured into a mold, where it was left at 85° C. during 20 hours.

A semirigid resin, insoluble in DELIFRENE/acetone and exhibiting the following mechanical characteristics:

| hardness (Shore A/3"): | 88 |
| --- | --- |
| tensile strength: | 75 kg/cm² |
| elongation at break: | 95% |
| Tg: | −120° C. | was obtained.

TABLE I

| | | | | | Hydroxy | | | |
| | | Molar Ratios | | Epoxy eq. | eq. weight | at 25° C. | at 50° C. | F |
| Test | BISPHENOL AF | DIOL 400 | EPICHLOROHYDRIN | weight[1] | [1] | η(poise) | η(poise) | content % |
| --- | --- | --- | --- | --- | --- | --- | --- | --- |
| 1 | 0.5 | 0.5 | 3 | 420 | nd[2] | 144 | 7.4 | 40 |
| 2 | 0.75 | 0.25 | 3 | 544 | nd[2] | nd[2] | 5477 | 38 |
| 3 | 0.25 | 0.75 | 3 | 440 | nd[2] | 5.3 | nd[2] | 51 |
| 4 | 0.5 | 0.5 | 1.2 | 1253 | 537 | nd[2] | 2858 | 43 |
| 5 | 0.5 | 0.5 | 1.05 | 7824 | 570 | nd[2] | 50000 | 46 |

[1] eq. weight = equivalent weight
[2] nd = not determined

What is claimed is:

1. Fluorinated polymers having the general formula:

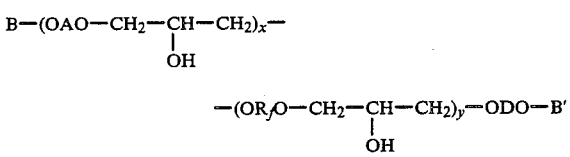

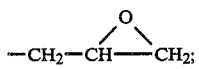

where the units x and y have a random distribution or a block distribution inside said polymer, and:
   x=an integer from 0 to 20, extremes included,
   y=an integer from 1 to 20, extremes included,
   B, B', independently of each other, are H or $$-CH_2-CH\underset{\diagdown}{\overset{O}{\diagup}}CH_2;$$

A=a radical of a fluorinated or non-fluorinated diol, containing one or more aromatic or cycloaliphatic or polycyclic rings;
$R_f$=a perfluoroalkylene radical deriving from the corresponding diol, comprising sequences of average molecular weight 500–7000 of fluorooxyalkylene units selected from the following classes:

I—(C₂F₄O), (CF₂O) said units being randomly placed along the fluoropolyoxyalkylene chain;

II—(C₃F₆O), (C₂F₄O), (CFXO) wherein X=F or CF₃, said units being randomly placed along the fluoropolyoxyalkylene chain;

III—(CH₂CF₂CF₂O) said units in the fluoropolyoxyalkylene chain being linked between them as follows:

—(OCF₂CF₂CH₂)—O—R'$_f$—O—(CH₂CF₂CF₂O)$_q$— wherein R'$_f$ is a fluoroalkylene group and p and q are integer, p+q being higher than 2;

IV—

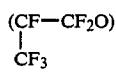

said units being linked between them in the fluoropolyoxyalkylene chain as follows:

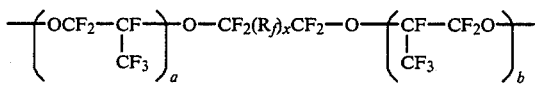

wherein R$_f$ is a fluoroalkylene group, x is 0 or 1, a and b are integer and a+b higher than 2;

V—(CF₂CF₂CF₂O);

VI—(CF₂CF₂O);

D=A or R$_f$.

2. The polymers according to claim 1, in which diol HOAOH is selected from the following compounds of formula:

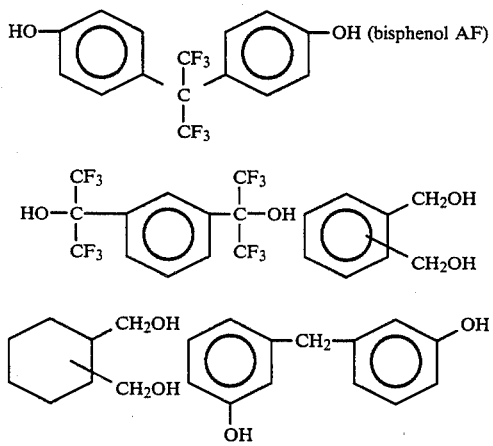

3. Resins containing bonds of the urethane type and prepared by treating the polymers of claim 1 with a polyisocyanate.

4. The resins according to claim 3, in which the polyisocyanate is selected from fluorinated diisocyanates having an average molecular weight from 500 to 7000 and comprised in the following general formula:

OCN—R—Z—CF₂O—(C₂F₄O)$_m$—(CF₂O)$_n$—CF₂—Z—R—NCO where:

Z may be a simple bond or a group of the type:

—CONH—, —CH₂—, —CH₂O—, —CH₂OCH₂—, —O—, —CH₂OSO₂—;

R is a divalent aliphatic radical with chain C₁-C₁₂, or a cycloaliphatic or aromatic radical, and where unit (CF₂O) and unit (C₂F₄O) are statistically distributed along the chain, m and n are integers and the m/n ratio ranges from 0.2 to 2, and preferably from 0.5 to 1.2.

5. The cross-linked resins according to claim 4, in which radical R of the polyisocyanate is selected from:

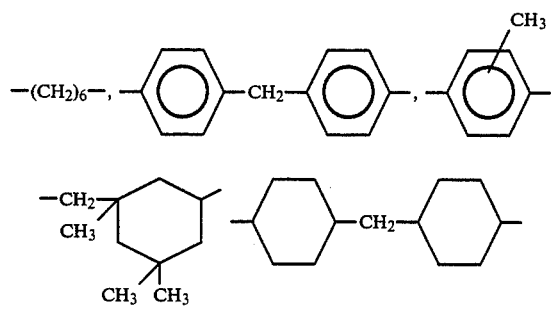

6. The cross-linked resins according to claim 3, in which the polyisocyanate is selected from: hexamethylenediisocyanate (HDI), isophoronediisocyanate (IPDI), toluenediisocyanate (TDI), methylene-bis-(4-cyclohexylisocyanate) (H₁₂MDI) and trimers of TDI and HDI.

7. The cross-linked resins according to claim 3, in which the OH/NCO equivalent ratio ranges from 0.7 to 1.3, preferably from 0.9 to 1.1.

8. The cross-linked resins according to claim 3, in which the crosslinking with polyisocyanate is accomplished in a solvent consisting of a 80/20 mixture of 1,1,2-trichlorotrifluoroethane and acetone.

9. Resins containing bonds of the epoxy type prepared by treating the polymers according to claim 1 containing epoxy end groups with polyamines or anhydrides of polycarboxy acids.

10. The resins according to claim 9, in which the utilizable polyamines are primary or secondary, aliphatic or aromatic amines or amines containing perfluoropolyoxyalkylene chains.

11. The resins according to claim 9, in which the polyamine is selected from: ethylenediamine, metaphenylenediamine, diethylenetriamine, xylyldiamine.

12. The resins according to claim 9, in which the anhydride of polycarboxy acids is selected from: phthalic anhydrides, Diels-Alder adducts.

13. A process for preparing protective coatings characterized in mixing together a solution of the polymers according to claim 1 and a solution containing an isocyanate, or an amine, or an anhydride, and in subsequently evaporating the solvent and subjecting the mixture to a heat-treatment.

14. The process for preparing resins according to claim 3, utilizable for preparing adhesives, which are suited also to low temperatures.

15. A process for preparing resins according to claim 9, which are employable for preparing adhesives, which are suited also to low temperatures.

16. A process for preparing resins according to claim 3, which are utilizable as structural materials with high mechanical characteristics.

17. A process for preparing resins according to claim 9, which are utilizable as structural materials with high mechanical characteristics.

18. A process for preparing resins according to claim 3, which are utilizable as protective films on magnetic tapes and discs.

19. A process for preparing resins according to claim 9, which are utilizable as protective films on magnetic tapes and discs.

20. A process for preparing resins according to claim 3, which are utilizable as protective coatings characterized by lubricating properties, a low wettability and a high resistance to atmospheric agents.

21. A process for preparing resins according to claim 9, which are utilizable as protective coatings characterized by self-lubricating properties, a low wettability and a high resistance to atmospheric agents.

* * * * *